United States Patent [19]

Simon

[11] 4,157,799

[45] Jun. 12, 1979

[54] CABLE GROMMET WITH TRACTION RELIEF

[76] Inventor: Hans Simon, Bruchhausener Strasse, 5463 Unkel, Rhein, Fed. Rep. of Germany

[21] Appl. No.: 852,025

[22] Filed: Nov. 16, 1977

[30] Foreign Application Priority Data

Nov. 23, 1976 [DE] Fed. Rep. of Germany ....... 2653163
Jan. 7, 1977 [DE] Fed. Rep. of Germany ....... 2700389

[51] Int. Cl.² .................... H01R 13/58; F16L 5/00
[52] U.S. Cl. .............................. 248/56; 174/153 G; 285/162; 285/195; 339/103 R
[58] Field of Search ............... 248/56, 27.3; 174/153 G, 152 G, 65 G; 339/103 B, 103 R, 103 M, 105; 16/2, 108, 109; 285/162, 195; 403/238, 239, 195, 197

[56] References Cited

U.S. PATENT DOCUMENTS

| 2,481,303 | 9/1949 | Frank et al. | 403/239 X |
| 2,973,212 | 2/1961 | Rose | 285/195 X |
| 3,397,280 | 8/1968 | Klumpp | 174/153 G |
| 3,562,847 | 2/1971 | Jemison | 174/153 G X |
| 3,584,888 | 6/1971 | Lott | 174/153 G X |
| 4,000,875 | 1/1977 | Jemison et al. | 248/56 |
| 4,002,822 | 1/1977 | Kurosaki | 174/153 G |

FOREIGN PATENT DOCUMENTS

| 540137 | 4/1957 | Canada | 285/162 |
| 1286173 | 1/1969 | Fed. Rep. of Germany. | |
| 2132758 | 1/1973 | Fed. Rep. of Germany | 174/153 G |
| 2502050 | 7/1976 | Fed. Rep. of Germany. | |

*Primary Examiner*—Rodney H. Bonck
*Attorney, Agent, or Firm*—John S. Roberts, Jr.

[57] ABSTRACT

The invention relates to a cable grommet with a traction relief particularly for guiding a cable through the opening of an apparatus wall or the like comprising a funnel body having a thoroughfare for said cable, shoulders extending into said opening of said apparatus wall, a setscrew arranged within said funnel body under an angle relative to the axis of the thoroughfare reacting via an intermediate piece upon said cable, wherein a shoulder is provided which is connected with said funnel body and extends from the side of said setscrew into said opening and a further shoulder is provided which is connected with said funnel body and supports said cable on the other side of said opening.

13 Claims, 13 Drawing Figures

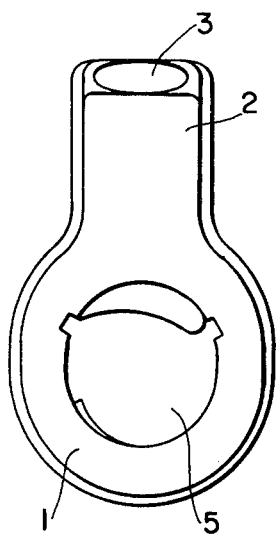
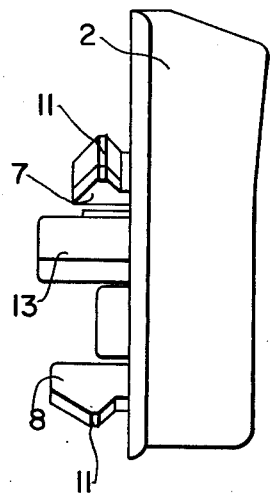
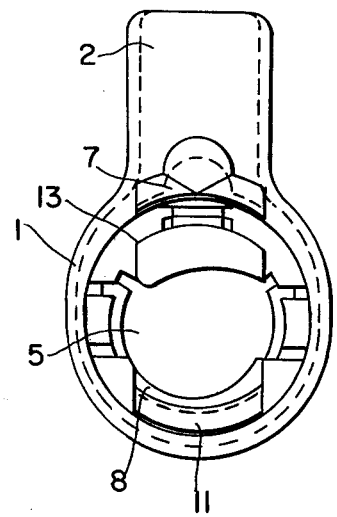
FIG. 1    FIG. 2    FIG. 3
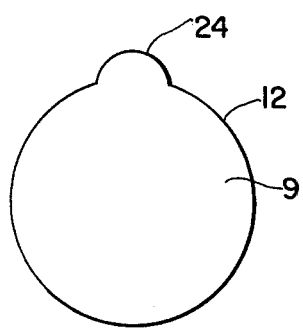
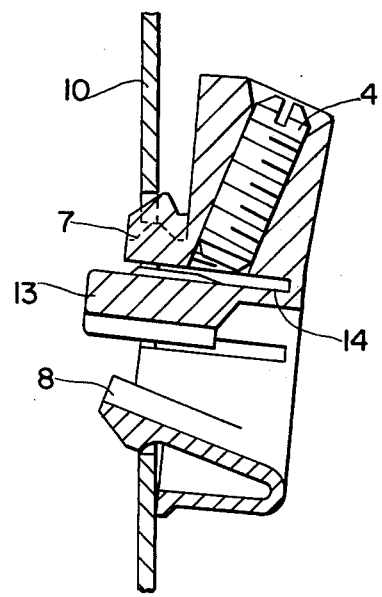
FIG. 4    FIG. 5

U.S. Patent   Jun. 12, 1979   Sheet 4 of 4   4,157,799
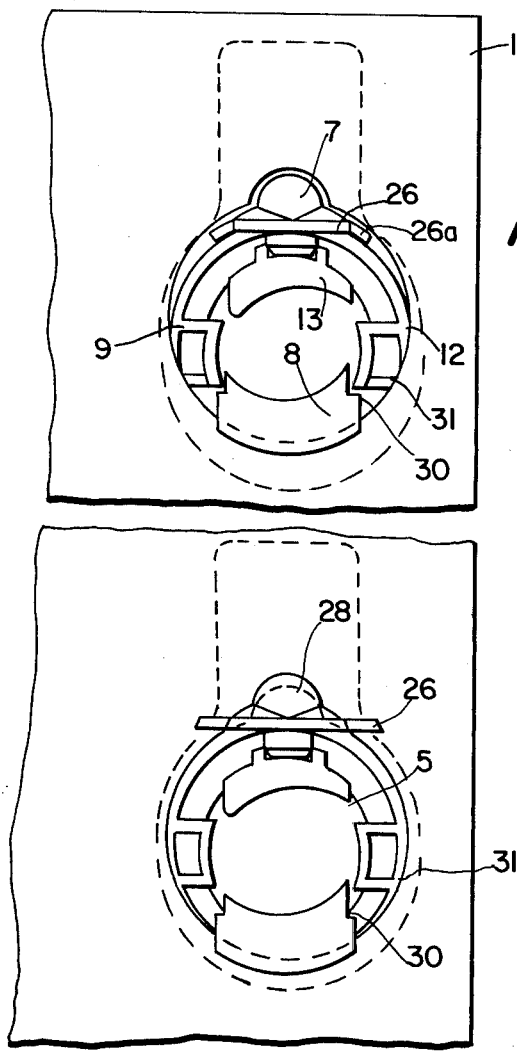
FIG. 11
FIG. 12
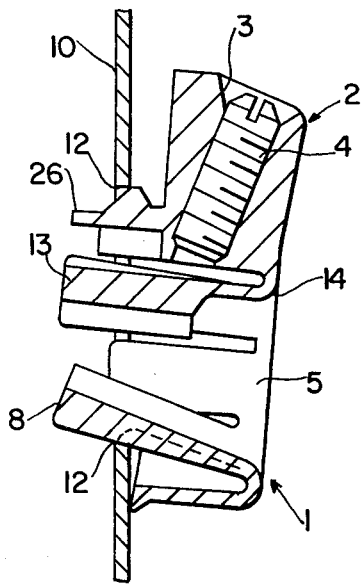
FIG. 10
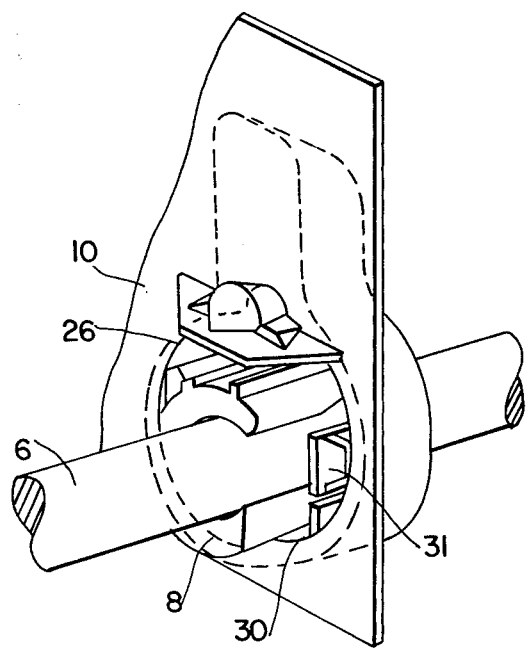
FIG. 13

CABLE GROMMET WITH TRACTION RELIEF

The invention relates to a strain relief cable grommet by which it is possible to guide a cable through the opening for instance of an apparatus wall or the like and at the same time to so secure it traction-relievingly that a traction exerted upon the cable is absorbed by this securement and damages of the apparatus and of the electric connections thereof are avoided.

Cable grommets of this kind have been known in a plurality of modifications. In most cases, they comprise screw couplings, for instance stuffing box screw couplings, wherein the cable is mostly guided through a rubber or plastic stopper and is then pressed together by tightening a setscrew. Although such cable screw couplings permit a certain traction relief, the latter is, as a rule, not sufficient, and it should moreover be taken into consideration that such a stuffing box like cable joint screw does not have the desired clamping range in order to traction-relievingly fasten thin as well as thick cables with one screw in the passage wall.

A further well-known cable grommet, as has for instance been described in German Patent No. 1,286,173, includes a number of biconically shaped clamping jaws of plastic material which are pressed against each other by setscrews and in this way fasten the cable with a relatively large area pressure.

Such a cable grommet constitutes a good traction relief for the cable and includes also a relatively great clamping range, on the other hand, however, it includes a plurality of individual component parts and is therefore expensive in the production and the assembly is difficult and therefore costly.

In further prior art cable grommets, the cable is clamped with the aid of setscrews inserted at right angles to the axial direction. Neither do these embodiments, by any means, constitute a satisfying solution.

It is therefore the aim of the present invention to provide a cable grommet which makes possible a clamping of the cable within the opening of a housing wall, including the necessary traction values, which furtheron includes a relatively great clamping range and thus may fasten cables of different thickness, and which, in addition, is made in one piece, so that it can, on one hand, be manufactured in a simple and inexpensive way and that no individual component parts can be lost and therefore can relatively easily be assembled, on the other.

This problem is solved with the aid of a cable grommet with traction relief, particularly for guiding a cable through the opening in an apparatus wall or the like comprising a funnel body having a thoroughfare for the cable, shoulders extending into the opening of the apparatus wall, a setscrew arranged within the funnel body under an angle relative to the axis of the thoroughfare reacting via an intermediate piece upon the cable, said cable grommet being characterized in that a shoulder is provided which is connected with the funnel body and extends from the side of the setscrew into the opening and a further shoulder is provided which is connected with the funnel body and supports the cable on the other side of the opening.

The cable grommet of the invention may, with the exception of the setscrew, be produced as one piece in one operation step by injection molding from plastic material. When ready for mounting, it consists also of only one piece with the setscrew already inserted so that no individual component parts can be lost when mounting it. The cable grommet according to the invention need only be inserted into the opening of the housing, the cable may be inserted and can safely be arrested by tightening the setscrew.

The setscrew acts on the cable via an intermediate piece through which the compressive force of the setscrew is transferred over a relatively great area upon the cable. The cable grommet with a shoulder connected with the funnel body and extending, from the side of the setscrew into the opening, supports against the edge of the opening and at the same time presses the cable against a further shoulder connected with the funnel body which supports the cable on the other side of the opening.

The setscrew is so directed that the pressing force is directly transferred upon the edges of the cable grommet opening while there are no plastic parts which would act like a lever and which would be subjected to the cold flow or which could bend or stretch.

It has shown to be suitable if the shoulder extending into the opening from the side of the setscrew is rigidly connected with the funnel body and the shoulder on the other side is flexibly connected with the funnel body. Both shoulders are suitably integral with the funnel body and it has shown to be particularly advantageous if the shoulder supporting the cable is dish shaped, for instance in the shape of a half dish in order to give the cable lateral support when it is squeezed together by the intermediate piece pushed from the setscrew.

In accordance with a further advantageous embodiment, the shoulder rigidly connected with the funnel body is also shaped as a dish and preferably matches the edge of the opening in the apparatus wall. When tightening the cable, the funnel body is in this way immovably secured in the opening of the apparatus wall.

The shoulders provided on the funnel body and extending into the opening of the apparatus wall are suitably conducted wholly through the opening of the apparatus wall and thus constitute an excellent protection against the sharp edges of the apparatus wall. As one of the shoulders is flexibly connected to the funnel body, the cable grommet can very easily be inserted into the provided opening as the shoulders can easily be pressed together and can be inserted into the opening.

A holding cam suitably provided on the free end of the shoulder rigid with the funnel body arrests the cable grommet so inserted into the apparatus opening, the cable can be inserted and can be secured in the cable grommet by tightening the setscrew.

In order to obtain a torsional protection, at least one of the shoulders extending into or through the opening in the apparatus wall is provided, in accordance with a further advantageous embodiment of the cable grommet of the invention, on its outer face with a projection preferably extending over the overall length thereof. This projection can engage with a recess provided in the edge of the opening and thus can protect the cable grommet against torsion.

It has shown to be suitable if the shoulder rigid with the funnel body is provided, on the outer face thereof, with such a projection preferably extending over the overall length thereof.

The shoulder supporting the cable on the side of the opening facing the setscrew may be provided in the same manner as the shoulder, rigidly connected with the funnel body, but instead of with the shoulder rigidly connected with the funnel body, it may be provided with a holding cam engaging behind the opening. Such a holding cam provided on both shoulders is, particularly when mounting the device, extremely advantageous and renders the cable grommet very stable also after tightening the setscrew.

Such a holding cam however requires, on the other side, always the same thickness of the apparatus wall. In practice, this may lead to disadvantages as the cable grommet according to the invention should be available for most various purposes and therefore a large assortment of cable grommets for varying wall thicknesses must be kept on stock.

A further advantageous embodiment of the cable grommet of the invention avoids this difficulty and simplifies stock keeping rather drastically.

In this embodiment according to the invention, the shoulder supporting the cable on the side of the opening facing the setscrew thickens like a wedge towards the free end thereof and thus enables the solid fixation of the cable in the openings of differently thick apparatus walls to be made. In an other advantageous embodiment of the present invention, the shoulder rigidly connected with the funnel body is provided with a projection conically thickening towards the free end thereof. This conically thickening projection enables the fixation of the cable grommet of the invention to be made in housing walls of different thicknesses.

As has been mentioned in the beginning, the setscrew acts on the cable via an intermediate piece.

In accordance with a particularly advantageous embodiment of the present invention, it has shown to be suitable when this intermediate piece provided between setscrew and cable comprises a clamping jaw connected via a hinge frame with the funnel body. In such an embodiment, the intermediate piece may integrally be manufactured with the cable grommet and it is, at the same time, undetachably connected to the cable grommet.

It has shown to be very useful to provide the clamping jaw as a support or clamping face in a lightly arched asymmetrical half dish or partial dish shape so that one face of the intermediate piece is thicker in axial direction of the thoroughfare opening than the other and hence possesses asymmetrical cross section. It is of advantage as well, if the dish shaped shoulder supporting the cable is also of asymmetrical cross section. By shaping the intermediate piece and/or the cable supporting dish shaped shoulder as in accordance with the invention, the pressing force exerted by the setscrew will so press the intermediate piece against the cable to be fixed that the upper side thereof forms a chamfering directed against the direction of rotation of the setscrew supporting via the fixed cable against the thicker edge of the lower half dish shaped shoulder. This will avoid lateral derangement of the setscrew and the functioning and the safety of the cable grommet according to the invention is further improved.

In accordance with a further advantageous embodiment of the present invention, the setscrew acts suitably upon the first third of the intermediate piece or clamping jaw extending into the opening. This causes that the pressing force of the setscrew acts unilaterally on the clamping jaw and presses this side deeper into the flexible cable than the other. Thus a chamfered face directed against the direction of traction of the fixed cable is formed which effects that a particularly big tensile strength is obtained.

The funnel body may be of round shape, it may on the other hand also have a lateral shoulder to accomodate the setscrew therein. Such a lateral shoulder provides the setscrew with a sufficiently long seat and makes possible, on the other hand, that the material consumption for the production of the cable grommet is kept at a minimum.

The setscrew which is guided within a threaded bore in this lateral shoulder shows preferably an angle of less than 90° relative to the cable axis. This causes that the inserted end of the setscrew extends also into the housing opening and acts on the clamping jaw. In this way, the length of the cable grommet can further be shortened and the material consumption for the cable grommet can further be reduced.

To guard the cable grommet inserted into the passage opening of an apparatus wall when not used, there can be employed, in accordance with a further advantageous embodiment of the present invention, in addition to the wedge shaped chamfering on the shoulder rigidly connected to the funnel body and/or on the shoulder supporting the cable on the side of the opening facing the setscrew, a locking wing of flexible plastic material which is arranged at the end of one of the shoulders of the funnel body passing through the passage opening and which in the end position thereof, i.e. in the inserted position of the cable grommet in the passage opening of the apparatus wall, extends, with the free ends thereof, beyond the edge of the passage opening so that demounting from the front face of the apparatus wall is practically impossible.

The width of the flexible locking wing perpendicular to the cable axis is preferably greater than the clear height on that location of the passage opening at which the locking wing passes through the passage opening when being inserted. The end portions of the locking wing which protrude during the insertion process are elastically pressed into the area of the passage opening when inserted and are inwardly bent so that locking wing as well as the shoulder connected with the locking wing are passed through the opening in the apparatus wall. As the locking wing will jump back into the elongated position after the elastic bending of the end portions thereof and after it had been passed through the apparatus opening, the cable grommet is, in this way, so safely anchored in the passage opening that it can no longer be demounted from the front face of the apparatus.

The cable grommet is preferably so dimensioned that the end position and the location of the passage of the locking wing through the opening are distant from the centre of the opening, the opening having an essentially circular cross section in general. The width of the flexible locking wing is preferably so chosen that the locking wing is broader than the tangent defined by the end position and the location of passage, on the other side however it is smaller than the diameter of the passage opening. By so dimensioning the locking wing width, a safe fixation of the cable grommet in the end position is secured if no cable has been inserted as well as if a cable has been fixed therein, as the ends of the locking wing extend beyond the passage opening in the end position of the locking wing but also if the locking wing is shifted from its end position, because of strong shocks or vibrations, in the direction towards the centre of the opening to the location of passage if no cable has been inserted. As the width of the locking wing is chosen smaller than the diameter of the passage opening, it is assertained that only relatively short end portions of the locking wing must be bent into the opening area when passing through the opening in the mounting process. By so dimensioning the arrangement of the wings, a cable grommet with traction relief is obtained which is detachable only with the aid of a tool and which is safe in the sense of the regulations.

In a preferred embodiment of the invention, the flexible locking wing is integral with the shoulder connected with the funnel body. The locking wing is preferably provided as a trapezoidal plastic plate having chamfered edges and is about perpendicular to the symmetric line of the cable grommet. The locking wing extends preferably about symmetrically with the acute-angled corners of the trapezoidal face beyond the two sides of the passage opening.

In accordance with a particularly preferred embodiment of the invention, the trapezoidal locking wing is arranged in the middle of the longest side line to the end of the shoulder rigidly connected with the funnel body.

The shoulder flexibly connected with the funnel body includes preferably lateral dislocations which can be pressed against stops rigidly provided on the funnel body and which limit the centrally directed elastic displaceability of the flexible shoulder upon the measure necessary for the assembly of the cable grommet.

If the flexible shoulder rests, in this compressed position, with the outer edge or outer rim of a holding cam provided on the flexible shoulder, on the edge of the passage opening, the locking wing is at about the passage location at which the locking wing is bent inwardly and is guided through the passage opening.

The locking wing stretches again and clings with the free ends thereof to the back side of the passage wall. The fixation of the device brought about cannot be released by moving it from the front face of the device or from the outer face of the apparatus. At the same time, the fixation is that rough that even rounded-off edges of the passage opening or lacquer, color, and zinc agglomerations do not impair the functioning of the device.

The invention will be more readily understood from the following description of exemplified embodiments thereof with reference to the accompanying drawings in which FIG. 1 is a front view of a cable grommet according to the invention.

FIG. 2 is a lateral view of the cable grommet according to the invention.

FIG. 3 is a back view of the cable grommet according to the invention.

FIG. 4 shows the opening provided in the apparatus wall.

FIG. 5 shows a cross section of a cable grommet according to the invention inserted into the passage opening of the apparatus wall.

FIG. 10 is a cross sectional lateral view of a further embodiment of a cable grommet according to the invention in the moment of the insertion thereof into a passage opening in an apparatus wall.

FIG. 11 is a back view of the embodiment depicted in FIG. 10, the locking wing being shown on the passage location thereof.

FIG. 12 is a back view of the embodiment depicted in FIG. 10 showing the locking wing in the end position thereof.

FIG. 13 is a further perspective view of the embodiment depicted in FIGS. 10 through 12 of the cable grommet according to the invention in the end position thereof with a cable inserted.

Figure 6:
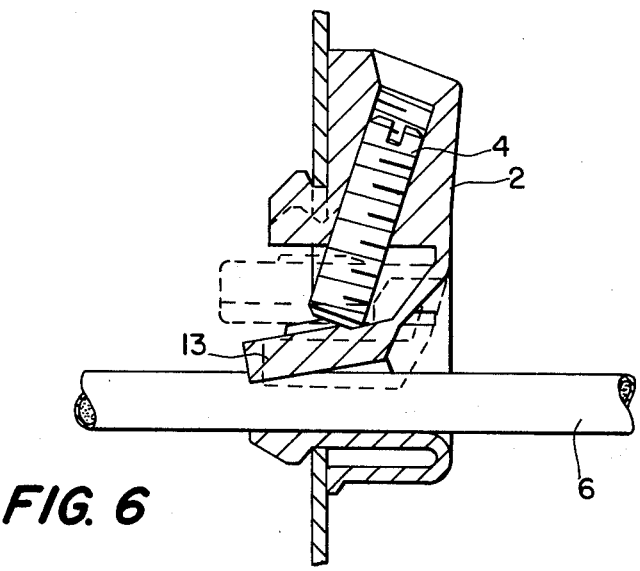
FIG. 6 shows the cross section of a cable grommet according to the invention with a cable inserted into the passage opening of the apparatus wall.

The cable grommet with traction relief shown in the drawings comprises a funnel body 1 to which, from the outside, shoulder 2 is attached in which bore 3 to receive setscrew 4 is provided. Funnel body 1 includes thoroughfare 5 for the passage of cable 6.

Funnel body 1 includes furtheron half dish shaped shoulder 7 rigidly connected therewith and half dish shaped shoulder 8 elastically connected therewith. Both are guided through opening 9 in apparatus wall 10. The two half dish shaped shoulders 7 and 8 are provided with arresting bulges or holding cams 11 with the aid of which the cable grommet is undetachably secured behind the edge 12 of entrance opening 9.

Between shoulder 7 rigidly connected to funnel body 1 and thoroughfare 5 for the accomodation of the cable, clamping jaw 13 is movably connected, via hinge strip 14, to funnel body 1. Clamping jaw 13 includes, as the support or clamping area, a slightly arched asymmetrical half dish shape 15 so that one side of the clamping jaw, as seen in the axial direction of thoroughfare 5, is thicker than the other side and hence has an asymmetrical cross section 16.

Half dish shaped shoulder 8 elastically connected with funnel body 1 includes also an asymmetrical cross section 17. The thicker side 18 is facing thinner side 19 of the clamping jaw. By so shaping, as in accordance with the invention, the clamping jaw and the elastic half dish shaped shoulder 8 connected with the funnel body, the setscrew of the clamping jaw will so press on the cable to be inserted that the surface of the clamping jaw forms a chamfering directed against the direction of torsion of setscrew 4 supporting via the inserted cable 6 against the thicker edge 18 of the lower half dish shaped shoulder 8. This avoids a lateral derangement of setscrew 4 and further improves functioning and solidity of the traction relief obtained by the cable grommet of the invention.

Figure 7:
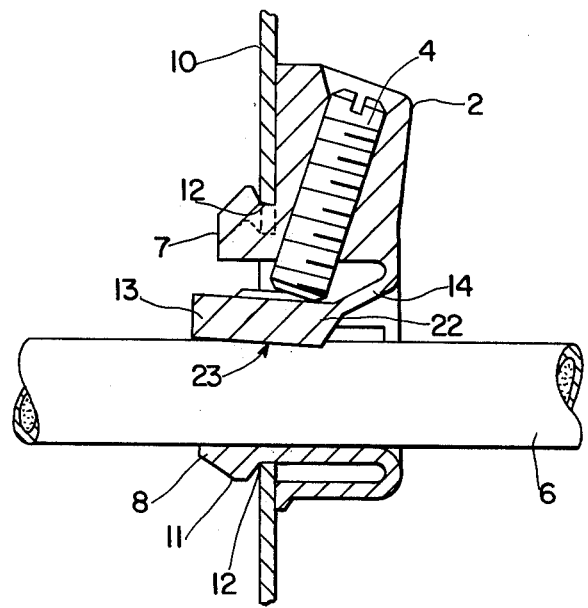
FIG. 7 shows the cross section of a cable grommet according to the invention with a cable inserted into the passage opening of the apparatus wall.

As can particularly be taken from FIGS. 6 and 7, the setscrew acts on the first third 22 of clamping jaw 13 and thus effects that the pressing force is distributed to an increased extent to the first third of the clamping jaw so that this first third is pressed deeper into the flexible cable than the remaining portion of the clamping jaw. In this way, a chamfered face 23, particularly recognizable in FIG. 7, is formed which is directed against the direction of traction of the inserted cable. This chamfered face constitutes a particularly advantageous traction relief for the cable inserted in the cable grommet, the pressing force being directly transferred upon the edges of the cable grommet opening while there are no plastic parts which would act like a lever and which would be subjected to the cold flow or which would bend or stretch.

Figure 8:
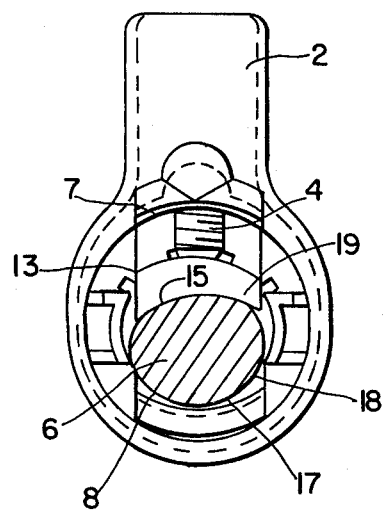
FIG. 8 is a back view of the cable grommet according to the invention with an inserted thick cable.
Figure 9:
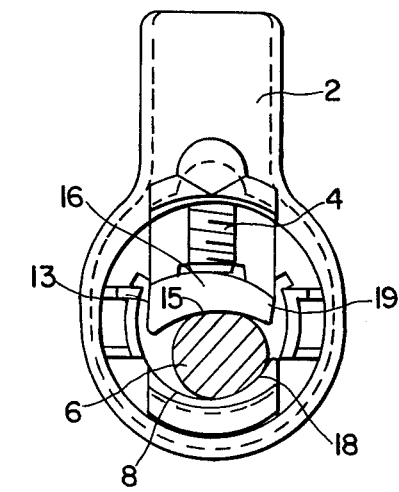
FIG. 9 is a back view of the cable grommet according to the invention with an inserted thin cable.

In FIGS. 8 and 9, the asymmetrical shape of clamping jaw 13 as well as of half dish shaped shoulder 8 can clearly be recognized.

Particularly in case of an oblique accommodation of the setscrew, i.e. under an angle relative to the cable axis of less than 90°, there is not only produced a pressure when tightening the setscrew; by tightening the setscrew, there is also generated a frictional force in the rotation sense of the setscrew which acts upon the clamping jaw and tries to shift the latter to the side. By asymmetrically shaping the clamping jaw, this is avoided.

In the embodiment shown in FIGS. 10 through 13 of the cable grommet according to the invention there is provided, at the lower end of shoulder 7, a locking wing 26 which extends in the end position thereof, when the cable grommet has been inserted, on both sides beyond edges 12 of passage opening 9. The width of flexible locking wing 26 is also greater than the tangent defined by the projection of the locking wing which is provided at the location of passage opening 9 at which locking wing 26 passes, when being inserted, through the passage opening. When mounting the cable grommet, end portion 26a of locking wing 26 should therefore be elastically pressed into the area of the passage opening as it would otherwise not be possible to push the locking wing through passage opening 9. As can furtheron be taken from FIGS. 11, 12, and 13, the width of locking wing 26 however is smaller than the diameter of passageopening 9 so that, at the location of passage, only relatively short end portions 26a of locking wing 26 have to be pushed to the centre of the passage opening. The end position of locking wing 26 is farther and the passage location less far from the centre of passage opening 9.

From FIGS. 11 and 12, it can furtheron be taken that the side walls of flexible shoulder 8 include a dislocation 30 each, which in case of an elastic shift of flexible shoulder 8 press finally against stop 31 provided on funnel body 1 and thus limit compressibility of the cable grommet in the direction to the cable axis. The shift path of dislocation 30 to the corresponding stop 31 is so dimensioned that the cable grommet can be passed, in the compressed state thereof and with end portions 26a of locking wing 26 pressed to the cable axis, through opening 9 in apparatus wall 10 from the front face. Demounting however cannot be accomplished from the front face alone.

The shape of the locking wing as in accordance with the preferred embodiment as depicted in the Figures, constitutes a flexible, plane, and trapezoidal plastic plate integrally provided in the direction of the cable axis, on rigid shoulder 7. Stops 31 are furtheron provided also to protect the cable against the sharp edge 12 of passage opening 9.

In addition, there is provided, as can particularly be taken from FIG. 11, on the clamping jaw, by two projections extending in axial direction, a guiding groove for the setscrew which also adds to avoid a lateral shift of the clamping jaw.

The embodiment according to the invention shown in FIGS. 10 through 13 is suitable for housing walls of different thicknesses as the half dish shaped shoulder 7 rigidly connected with the funnel body as well as shoulder 8 flexibly connected with the funnel body and supporting the cable in the opening of the apparatus walls are wedge shaped and do not have the holding cams depicted in the former embodiments. By this wedge like shape, the cable grommet can be inserted into openings of differently thick housing walls and can safely be arrested together with the inserted cable by tightening setscrew 4.

As shown in FIG. 4, the opening in the apparatus wall includes a recess 24 into which a projection 28 extending over the total length of shoulder 7 rigidly connected with the funnel body will catch and thus secure the cable grommet of the invention against torsion.

From FIGS. 8 and 9, the extended clamping range of the cable grommet of the invention can be taken whereby in FIG. 8 a relatively thick cable 6 and in FIG. 9 a relatively thin cable 6 has traction-relievingly been fastened.

I claim:

1. A strain relief cable grommet for securing a cable in a wall opening comprising a body member having means defining an opening through which a cable can be passed, said body member also having a threaded set screw receiving bore extending therethrough at an angle relative to the axis of said opening, said means including a flexible clamping jaw extending from said body member and having a length to extend through said wall opening and underlying said bore, a rigid shoulder extending from said body member and having a length to extend through said wall opening and overlying and spaced from said clamping jaw, said means also including a further and flexible shoulder extending from said body member, facing said clamping jaw and having a length to extend through said wall opening, both said clamping jaw and flexible shoulder having arcuate facing surfaces and an asymmetrical cross-section transverse of their axes with the thicker portion of one facing the thinner portion of the other whereby when the grommet with an inserted round cable extending therethrough is placed in the wall opening and a set screw is threaded into said bore to apply said clamping jaw against such a cable, the asymmetrical configuration of said facing surfaces alters the roundness of such a cable.

2. Cable grommet according claim 1, wherein said rigid shoulder is provided, at the end thereof extending from said opening, with a holding cam.

3. Cable grommet according to claim 2, wherein at least one of said shoulders extending through said wall opening is provided on the outer face thereof with a projection preferably extending over the total length thereof.

4. Cable grommet according to claim 3, wherein said rigid shoulder is provided on the outer face thereof with a projection preferably extending over the total length thereof.

5. Cable grommet according to claim 4, wherein said further and flexible shoulder supporting said cable on the side of said opening facing said setscrew receiving bore is provided, at the end thereof, with a holding cam extending behind said wall opening.

6. Cable grommet according to claim 4, wherein said further and flexible shoulder supporting said cable on the side of said opening facing said setscrew receiving bore thickens like a wedge towards the end thereof.

7. Cable grommet according to claim 6, wherein said rigid shoulder is provided with a projection conically thickening towards the free end thereof.

8. Cable grommet according to claim 1, wherein said setscrew acts on the first third of said clamping jaw extending into said opening.

9. Cable grommet according to claim 8, wherein a lateral shoulder is provided on said funnel body to receive said setscrew.

10. Cable grommet according to claim 1, wherein said setscrew receiving bore is arranged at an angle of less than 90°.

11. Cable grommet according to claim 1, wherein at the end of one of said shoulders of said body member a locking wing consisting of a flexible plastic piece is provided which in the end position thereof extends beyond the edge of said passage opening.

12. Cable grommet according to claim 11, wherein the protruding ends of said locking wing can elastically be pressed together for insertion.

13. Cable grommet according to claim 11, wherein said further and flexible shoulder and said body member includes cooperating abutment means which limit the centrally directed elastic displaceability of said flexible shoulder upon the measure necessary for the assembly of said cable grommet.

* * * * *